(12) United States Patent
Atarashi

(10) Patent No.: US 8,040,093 B2
(45) Date of Patent: Oct. 18, 2011

(54) MOTOR CONTROLLER

(75) Inventor: Hirofumi Atarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 630 days.

(21) Appl. No.: 12/184,526

(22) Filed: Aug. 1, 2008

(65) Prior Publication Data

US 2009/0033258 A1 Feb. 5, 2009

(30) Foreign Application Priority Data

Aug. 3, 2007 (JP) .................................. 2007-202883

(51) Int. Cl.
*H02P 6/14* (2006.01)
(52) U.S. Cl. ..................... 318/400.27; 318/494; 318/802
(58) Field of Classification Search ............. 318/400.27, 318/494, 802, 801, 811, 762, 757, 400.3, 318/400.41; 363/131
See application file for complete search history.

(56) References Cited

U.S. PATENT DOCUMENTS

| 5,151,641 | A | 9/1992 | Shamoto |
| 6,262,896 | B1 | 7/2001 | Stancu et al. |
| 2001/0036097 | A1 * | 11/2001 | Kikuchi et al. ............... 363/131 |

FOREIGN PATENT DOCUMENTS

| EP | 1508955 | A1 | 2/2005 |
| JP | 8-331705 | A | 12/1996 |
| JP | 10-271784 | A | 10/1998 |
| JP | 11-122980 | A | 4/1999 |
| JP | 2001-136721 | A | 5/2001 |
| JP | 2004-187450 | A | 7/2004 |
| JP | 2006-50706 | A | 2/2006 |
| WO | 97/02649 | A1 | 1/1997 |
| WO | 2005/076457 | A1 | 8/2005 |

OTHER PUBLICATIONS

European Search Report dated Jan. 22, 2009, issued in corresponding European Patent Application No. 08161512.2.
Japanese Office Action dated Jun. 23, 2009 (mailed date), issued in corresponding Japeanese Patent Application No. 2007-202883.

* cited by examiner

*Primary Examiner* — Karen Masih
(74) *Attorney, Agent, or Firm* — Westerman, Hattori, Daniels & Adrian, LLP

(57) ABSTRACT

A motor controller for an axial-gap motor permits a reduced size of the entire system of including a drive circuit and a power source of the motor, reduced cost, and higher reliability to be achieved by controlling the energization mode of the motor. The motor controller has a torque command determiner which inputs a first DC voltage to a first inverter at least either when a rotor is at a halt or when the number of revolutions of the rotor is a predetermined number of revolutions or less, supplies a field axis current for changing the magnetic flux of a field of the rotor to a first stator from the first inverter such that the amount of energization is temporally changed, converts an induced voltage developed in a second stator by the supplied field axis current into a second DC voltage by a second inverter, and outputs the second DC voltage, thereby charging a second battery.

7 Claims, 8 Drawing Sheets

MOTOR CONTROLLER

BACKGROUND OF THE INVENTION

1. Field of the Invention

The present invention relates to a controller for an axial-gap motor.

2. Description of the Related Art

Hitherto, there has been known an axial-gap motor equipped with a rotor having permanent magnets, two stators provided, one each of which is disposed on each side of the rotor in the rotational axial direction of the rotor, and armature windings wrapped around each of the stators, as disclosed in, for example, Japanese Patent Application Laid-Open No. H10-271784 (hereinafter referred to as cited document 1) and Japanese Patent Application Laid-Open No. 2001-136721 (hereinafter referred to as cited document 2). Such an axial-gap motor is capable of generating a relatively high output torque while achieving a reduced length of the rotor of the motor in the axial direction.

According to the techniques disclosed in the above cited documents 1 and 2, the energization of an axial-gap motor is controlled by the passage of current through the armature windings of the two stators, one each of which is disposed on each side of the rotor. This arrangement reduces the leakage of magnetic fluxes in the armatures of the stators, thus leading to increased output torque of the motor.

Here, it is conceivable to operate the axial-gap motor also as a generator, so that the motor runs in a power running mode and a regenerating mode. However, the cited documents 1 and 2 do not refer to any construction for operating the axial-gap motor in an energization mode for running the motor in a regenerative mode or the like other than the one for operating the motor in a power running mode.

SUMMARY OF THE INVENTION

The present invention has been made with a view of the background described above, and it is an object of the invention to provide a motor controller which controls the energization mode of an axial-gap motor, thereby making it possible to achieve a smaller size, lower cost, and higher reliability of the entire controller including a drive circuit and a power source of the motor.

To this end, the present invention provides a controller for an axial-gap motor equipped with a rotor, and a first stator and a second stator installed, opposing each other with the rotor interposed therebetween in the rotational axial direction of the rotor. The first stator and the second stator have coils for a plurality of phases.

The motor controller in accordance with the present invention includes a first inverter connected to the first stator, a second inverter connected to the second stator, and a voltage conversion controller which inputs a first DC voltage to the first inverter to supply a field axis current for changing the magnetic flux of a field of the rotor to the first stator from the first inverter while temporally changing the amount of the field axis current, and converts an induced voltage produced in the second stator according to the supplied field axis current into a second DC voltage by the second inverter and then outputs the second DC voltage in at least one of two cases where the rotor is at a halt and where the number of revolutions of the rotor is a predetermined number of revolutions or less.

With this arrangement, the voltage conversion controller inputs a first DC voltage to the first inverter and supplies the field axis current to the first stator from the first inverter while temporally changing the amount of the field axis current either in the case where the rotor is at a halt and no regenerative voltage is produced at the second stator or in the case where the number of revolutions of the rotor is a predetermined number of revolutions or less and the regenerative voltage produced at the second stator remains low or in both cases.

Further, it is possible to develop an induced voltage at the second stator by supplying the field axis current to the first stator and to convert the induced voltage into a second DC voltage by the second inverter and then to output the second DC voltage. Hence, even if the rotor is at halt or the number of revolutions of the rotor is the predetermined number of revolutions or less, the configuration established by the first inverter, the motor, and the second inverter functions as a DC/DC converter, making it possible to obtain the second DC voltage from the first DC voltage.

This arrangement obviates the need for a separate DC/DC converter to be provided to convert the first DC voltage into the second DC voltage, thus allowing the entire controller including the drive circuit and the power source of the motor to be smaller and less costly. Moreover, the reduced number of components permits higher reliability.

The voltage conversion controller carries out a power-running/regenerative operation whereby drive current is supplied to the first stator from the first inverter to operate the motor in a power running mode and a regenerative voltage produced in the second stator according to a revolution of the rotor is converted into a DC voltage by the second inverter and then the DC voltage is output, and while the power-running/regenerative operation is being carried out, the drive current is supplied to the first stator from the first inverter and the field axis current is also supplied while temporally changing the amount of the field axis current to be supplied, and a regenerative voltage produced at the second stator according to a revolution of the rotor and an induced voltage produced in the second stator according to the supplied field axis current are converted into the second DC voltage by the second inverter and then the second DC voltage is output.

With this arrangement, the voltage conversion controller supplies the drive current to the first stator from the first inverter while the power-running/regenerative operation is being carried out and also supplies the field axis current while temporally changing the amount of the field axis current. Thus, the regenerative electric power generated at the second stator according to a revolution of the rotor makes it possible to increase the electric power produced from the second DC voltage output from the second inverter according to the supplied field axis current in the case where there is a shortage of electric power from the second DC voltage output from the second inverter.

Further, if the number of revolutions of the rotor is a predetermined number of revolutions or less and the drive current is a predetermined current value or more while the power-running/regenerative operation is being carried out, the voltage conversion controller supplies the drive current by means of rectangular-wave energization to the first stator from the first inverter.

With this arrangement, if the number of revolutions of the rotor is a predetermined number of revolutions or less and the drive current is a predetermined current value or more, the drive current is supplied in a rectangular-wave energization mode to the first stator from the first inverter, making it possible to reduce the peak value of the drive current, as compared with typical drive current supply in a sinusoidal-wave energization mode. This allows the upper limit of the drive current that can be supplied to be extended, leading to an expanded control range of the motor.

The motor controller in accordance with the present invention further includes an AC power source connector for connecting with an AC power source, an AC/DC converter which is connected between the AC power source connector and the first inverter and which converts an AC voltage output from the AC power source into a DC voltage when the AC power source is connected to the AC power source connector, and then outputs the DC voltage to the first inverter, and a DC power source connected to the second inverter, wherein the voltage conversion controller defines the DC voltage supplied to the first inverter from the AC/DC converter as the first DC voltage, supplies the field axis current to the rotor from the first inverter while temporally changing the amount of the field axis current when the AC power source is connected to the AC power source connector, converts an induced voltage generated in the second stator according to the supplied field axis current into a DC voltage by the second inverter, and charges the DC power source with the DC voltage.

With this arrangement, connecting the power source connector to an AC power source, e.g., the outlet of a commercial AC power source provided in a house, makes it possible to convert an AC voltage supplied from the commercial AC power source into the second DC voltage by the combination of the AC/DC converter, the first inverter, the motor, and the second inverter so as to charge the DC power source with the obtained second DC voltage.

Further, the rotor has the field poles of permanent magnets and the field poles of unmagnetized magnetic members, which are alternately disposed in the circumferential direction, one of the N-pole and the S-pole of the permanent magnets is provided, opposing the first stator, while the other pole is provided, opposing the second stator.

This arrangement makes it possible to enhance the coupling coefficient of the first stator and the second stator as a transformer, thereby achieving higher efficiency of the configuration of the first inverter, the motor, and the second inverter when the configuration functions as a DC/DC converter.

Further, the field poles of the unmagnetized magnetic members are formed such that the magnetic resistance changes in the circumferential direction.

This arrangement makes it possible to further enhance the coupling coefficient of the first stator and the second stator as a transformer, thereby achieving higher efficiency of the configuration composed of the first inverter, the motor, and the second inverter when the configuration functions as a DC/DC converter.

Further, the cross-sectional area of a magnetic circuit of the first stator and the cross-sectional area of a magnetic circuit of the second stator are the same.

This arrangement makes it possible to enhance the coupling coefficient of the first stator and the second stator as a transformer, thereby achieving higher efficiency of the configuration of the first inverter, the motor, and the second inverter when the configuration functions as a DC/DC converter.

DESCRIPTION OF THE PREFERRED EMBODIMENTS

An embodiment of the present invention will be described with reference to FIG. 1 to FIG. 8.

Figure 1:
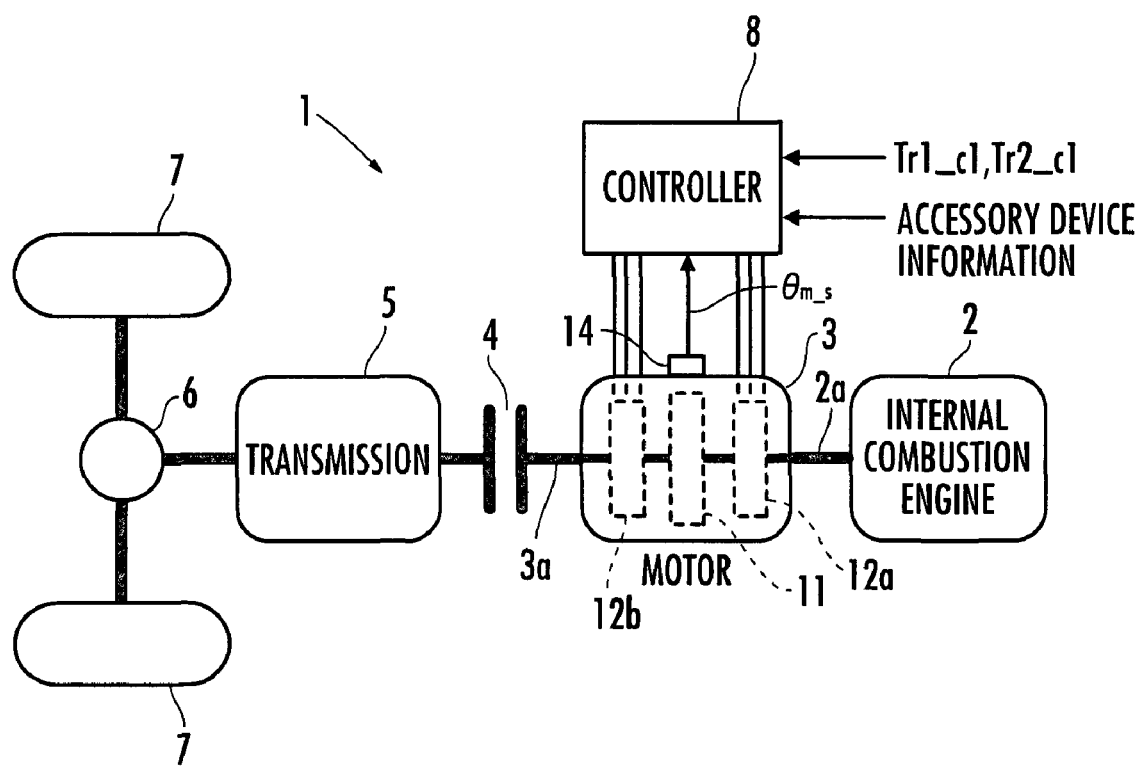
FIG. 1 is a block diagram illustrating a vehicle provided with a motor controller according to the present invention.

First, referring to FIG. 1, the schematic construction of a vehicle provided with a motor controller according to the present invention will be described. A vehicle 1 in the present embodiment is a parallel type hybrid vehicle and provided with an internal combustion engine 2 as the main driving power generating source thereof and a motor 3 as an auxiliary driving power generating source. The motor 3 is an axial-gap motor equipped with a rotor 11, a first stator 12a, and a second stator 12b. The motor 3 is further equipped with a resolver 14 which detects the rotational angle of the rotor 11.

An output shaft 2a of the internal combustion engine 2 is coaxially and directly connected to a rotating shaft 3a which rotates integrally with the rotor 11 of the motor 3. The output shaft 2a of the internal combustion engine 2 and the rotating shaft 3a of the motor 3 may be connected through the intermediary of a power transmitting device, such as a speed reducer. The output shaft 2a and the rotating shaft 3a are connected to the input end of a transmission 5 via a clutch 4. The output end of the transmission 5 is connected to driving wheels 7 and 7 of the vehicle 1 through the intermediary of a differential gear unit 6.

In the vehicle 1, an output torque of the internal combustion engine 2 or a torque obtained by adding an output torque, i.e., a power running torque, of the motor 3 thereto is transmitted as the driving power of the vehicle 1 to the driving wheels 7 and 7 through the intermediary of the clutch 4, the transmission 5, and the differential gear unit 6. This causes the vehicle 1 to travel. The motor 3 generates electric power for the motor 3 by using the kinetic energy of the vehicle 1 transmitted to the motor 3 from the driving wheels 7 and 7, while at the same time carries out the regenerative operation to charge a battery, which is the power source of the motor 3, with the generated electric energy. The regenerative torque generated by the motor 3 in a regenerative operation mode serves as a braking force of the vehicle 1.

The vehicle 1 is provided with a controller 8 which controls the operation of the motor 3. The controller 8 receives a detection value θm_s of the rotational angle of the rotor 11 from the resolver 14, a torque command value Tr1_c1, which is a required value of a torque from the first stator 12a of the motor 3, a torque command value Tr2_c1, which is a required value of a torque from the second stator 12b of the motor 3, and information on electric accessory devices, such as an air conditioner, audio equipment, and the like mounted in the vehicle 1. The torque command values Tr1_c1 and Tr2_c1 are determined on the basis of the manipulated variable of an accelerator gas pedal or the manipulated variable of a brake pedal, the vehicle speed, and the like of the vehicle 1 by a vehicle drive controller (not shown) engaged in the overall drive control of the vehicle 1.

The controller 8 controls the current supplied to the armature windings of the first stator 12a and the second stator 12b such that a torque based on the torque command values Tr1_c1 and Tr2_c1 is generated in the motor 3.

Figure 2A:
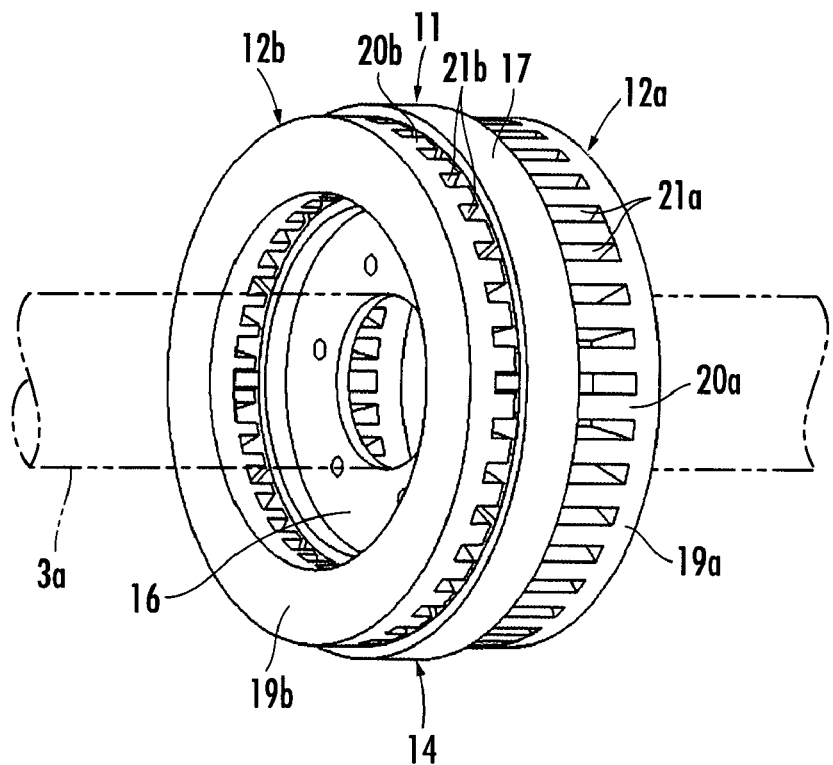
FIGS. 2(a) and 2(b) are explanatory diagrams of the construction of an axial-gap motor.
Figure 2B:
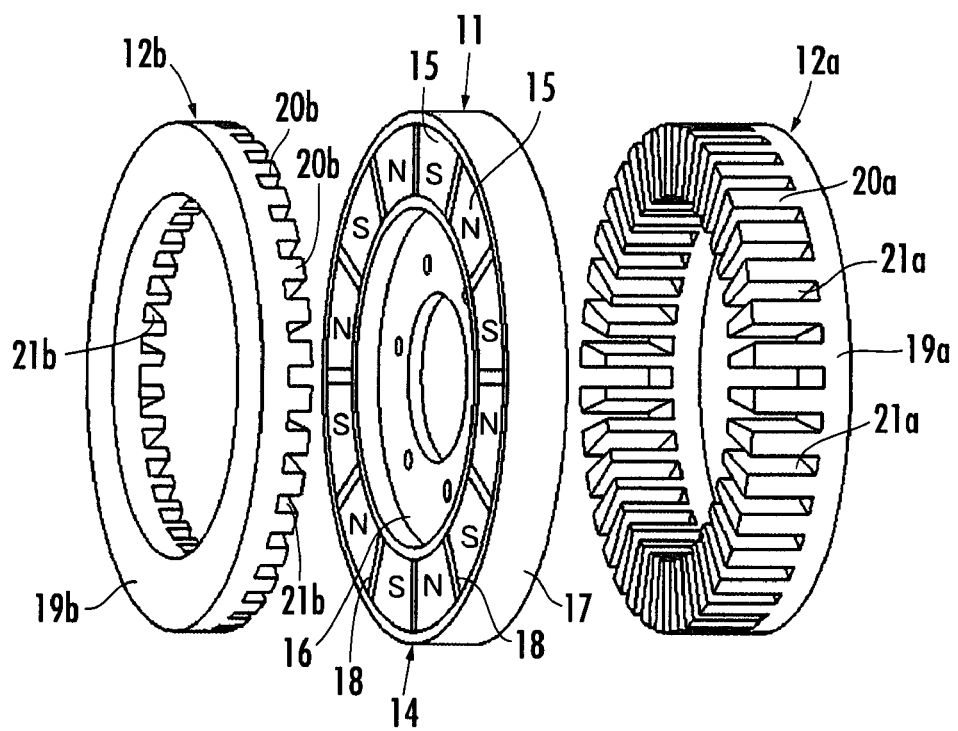

FIGS. 2(a) and 2(b) are perspective views illustrating the structures of the rotor 11, the first stator 12a and the second stator 12b of the motor 3. FIG. 2(a) illustrates the rotor 11, the first stator 12a, and the second stator 12b in the motor 3 in an assembled state. FIG. 2(b) illustrates the rotor 11, the first stator 12a, and the second stator 12b of the motor 3 in an exploded manner.

The rotor 11 is constituted of a frame assembly 14 composed of a nonmagnetic material and a plurality of permanent magnets 15 attached to the frame assembly 14. The frame assembly 14 is constructed of a disc-shaped base member 16, an annular member 17 coaxially disposed around the base member 16 with an interval provided between itself and the outer circumferential surface of the base member 16 in the radial direction, and a plurality of partitioning plates 18 connecting the base member 16 and the annular member 17, which are all formed into one piece. As indicated by the virtual lines in FIG. 2(a), the rotating shaft 3a is coaxially attached to the base member 16.

The plurality of partitioning plates 18 is radially extended between the outer circumferential surface of the base member 16 and the inner circumferential surface of the annular member 17, and disposed at equiangular intervals around the axial center of the rotor 11. Further, each of the permanent magnets 15 is fitted in each space surrounded by the outer circumferential surface of the base member 16, the inner circumferential surface of the annular member 17, and the partitioning plates 18, 18 adjoining each other in the circumferential direction of the rotor 11, the permanent magnets 15 having the same shape, namely, a fan shape, as that of the space. Thus, the plurality of permanent magnets 15 is arranged at equiangular intervals about the axial center of the rotor 11 between the base member 16 and the annular member 17.

Each of the permanent magnets 15 is a magnet, one surface of which in the direction of the thickness thereof, i.e., in the axial direction of the rotor 11, is the N-pole, while the other surface is the S-pole. In permanent magnets 15 and 15 adjoining each other in the circumferential direction of the rotor 11, the magnetic poles of their surfaces on the same side in the direction of their width are opposite from each other, as illustrated by the permanent magnets 15 in FIG. 2(b). In other words, the plurality of permanent magnets 15 of the rotor 11 are arranged such that the directions (the directions along the axial direction of the rotor 11) of the magnetic fluxes of the permanent magnets 15 and 15 adjoining in the circumferential direction of the rotor 11 will be opposite from each other.

In the example illustrated in FIG. 2(a) and FIG. 2(b), the number of the permanent magnets 15 is twelve, and the number of pairs of poles of the rotor 11 is six. Alternatively, the permanent magnets may be disposed separately on one surface and the other surface in the axial direction of the rotor 11.

The first stator 12a and the second stator 12b share the same construction except for their thickness. As illustrated in FIG. 2(b), the first stator 12a has a plurality of teeth 20a, which are provided on one surface of the two end surfaces of an annular base member 19a in the axial direction thereof such that the teeth 20a project in the axial direction of the base member 19a, the teeth 20a being arranged at equiangular intervals around the axial center of the base member 19a. Similarly, the second stator 12b has a plurality of teeth 20b which are protrusively provided in the axial direction of an annular base member 19b at equiangular intervals around the axial center of the base member 19b.

The base members 19a, 19b and the teeth 20a, 20b are integrally formed using magnetic materials. In the example illustrated in FIG. 2(a) and FIG. 2(b), the number of the teeth 20a of the first stator 12a is thirty-six and the number of the teeth 20b of the second stator 12b is thirty-six.

Figure 3A:
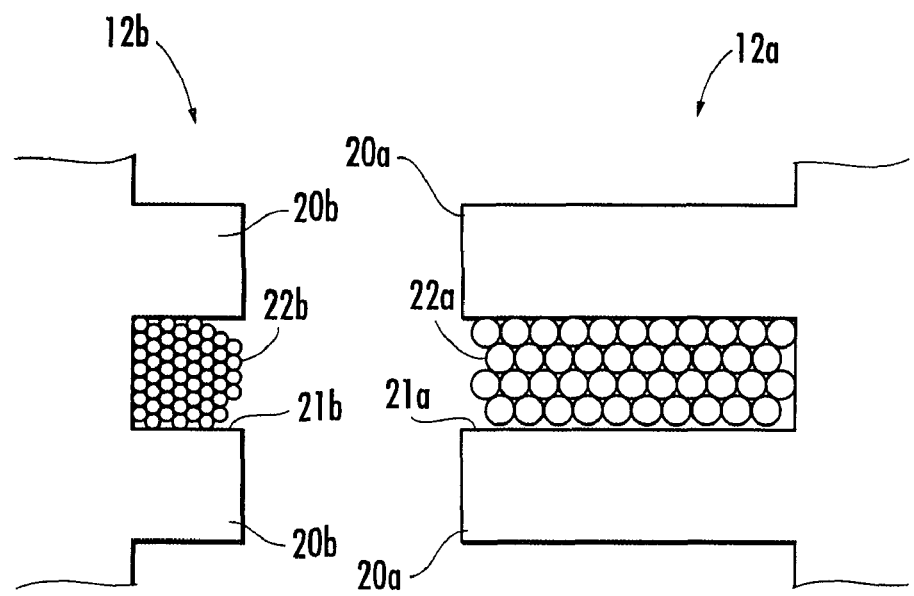
FIGS. 3(a) and 3(b) are explanatory diagrams illustrating armature windings wrapped around a first stator and a second stator, respectively.

FIG. 3(a) is a sectional view of the first stator 12a and the second stator 12b. As illustrated in FIG. 2(b) and FIG. 3(a), the first stator 12a has armature windings 22a installed in a slot 21a, which is a groove between teeth 20a and 20a adjoining each other in the circumferential direction. Similarly, the second stator 12b has armature windings 22b in a slot 21b, which is a groove between the teeth 20b and 20b adjoining each other.

In the present embodiment, the armature windings 22a installed on the first stator 12a and the armature windings 22b installed on the second stator 12b cover three phases (the U-phase, the V-phase, and the W-phase). The manner in which the armature windings 22a are wrapped around the first stator 12a and the manner in which the armature windings 22b are wrapped around the second stator 12b are the same.

The armature windings 22a for the individual phases of the first stator 12a are wrapped around the first stator 12a such that the same number of winding loops as the number of the permanent magnets 15 of the rotor 11 are formed at equiangular intervals in the circumferential direction of the first stator 12a, as observed in the axial direction of the first stator 12a. The same applies to the armature windings 22b of the second stator 12b.

Further, the winding pattern of the armature windings 22a of the first stator 12a is the same as the winding pattern of the armature windings 22b of the second stator 12b, but the number of turns of the armature windings 22b is set to be smaller than that of the armature windings 22a. With this arrangement, when a predetermined drive voltage is applied to the armature windings 22a of the first stator 12a to rotate the rotor 11, a voltage generated in the armature windings 22b of the second stator 12b will be lower than the predetermined drive voltage.

The diameter of the armature windings 22a of the first stator 12a is larger than that of the armature windings 22b of the second stator 12b, thus making the second stator 22b thinner than the first stator 22a.

In the motor 3 in the assembled state, the first stator 12a and the second stator 12b are disposed coaxially with the rotor 11, one each, on either side of the rotor 11 in the axial direction, with the rotor 11 interposed between the first stator 12a and the second stator 12b, as illustrated in FIG. 2(a), and secured to a housing (not shown) of the motor 3. In this case, the distal surfaces of the teeth 20a of the first stator 12a and the teeth 20b of the second stator 12b closely oppose the rotor 11.

In the present embodiment, as observed in the axial direction of the rotor 11, the first stator 12a and the second stator 12b are installed in the motor 3 such that the position of each of the teeth 20a of the first stator 12a (the angular position about the axial center) aligns with the position of each of the teeth 20b of the second stator 12b (the angular position about the axial center).

More specifically, the individual teeth 20a of the first stator 12a and the individual teeth 20b of the second stator 12b are assembled such that they exactly oppose each other in the axial direction of the rotor 11. The armature winding 22a of a phase of the first stator 12a and the armature winding 22b of the second stator 12b of the same phase as that of the first stator 12a are wrapped around the first stator 12a and the second stator 12b, respectively, such that, for each phase, the winding loops of the armature windings 22a of the first stator 12a and the winding loops of the armature windings 22b of the second stator 12b oppose each other in the axial direction of the rotor 11 (such that the winding loops of the first stator 12a and the winding loops of the second stator 12b are positioned at the same angle, as observed in the axial direction of the rotor 11).

Therefore, if the armature winding 22a of a phase of the first stator 12a and the armature winding 22b of the second stator 12b of the same phase as that of the armature winding 22a are energized by current of the same phase, then the magnetic flux generated by the armature winding 22a of the first stator 12a and the magnetic flux generated by the armature winding 22b of the second stator 12b mutually enhance each other to a maximum in the axial direction of the rotor 11 for each phase.

Figure 3B:
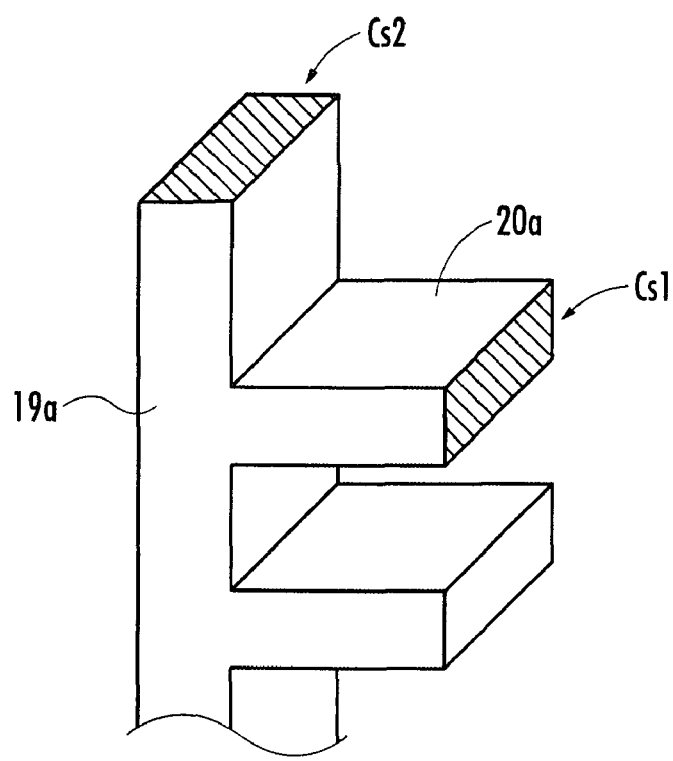

In the present embodiment, the first stator 12a and the second stator 12b have the same construction expect for their thicknesses, so that the magnetic circuit sectional areas (the sectional area of the flux path) for each phase of the first stator 12a and the second stator 12b are the same. Here, as illustrated in FIG. 3(b) in connection with the first stator 12a, the magnetic circuit sectional area refers to a sectional area Cs1 in the axial direction of the tooth 20a and the sectional area Cs2 in the circumferential direction of the base member 19a. The same applies to the second stator 12b.

Figure 4:
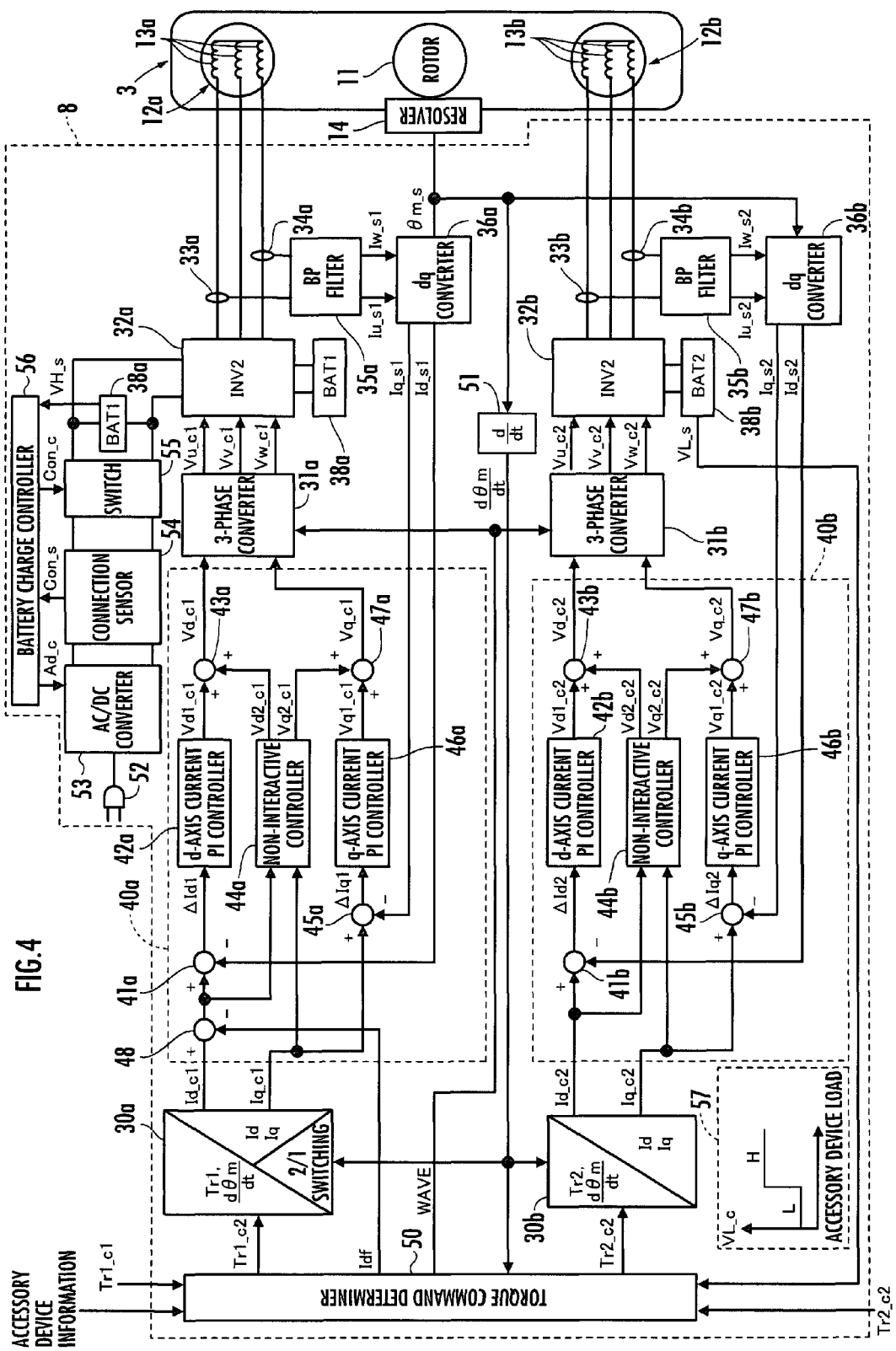
FIG. 4 is a block diagram showing the functional configuration of the motor controller.

Referring now to FIG. 4, the construction of the controller 8 will be described. FIG. 4 is a block diagram illustrating the functional construction of the controller 8. The controller 8 is composed of an electronic circuit unit which includes a microcomputer and the like. In the following description, reference numeral 13a is assigned to the armature winding for each phase wrapped around the first stator 12a, and reference numeral 13b is assigned to the armature winding for each phase wrapped around the second stator 12b, as illustrated in FIG. 4.

First, the processing for controlling the motor 3 carried out by the controller 8 will be schematically described. In the present embodiment, the so-called d-q vector control is conducted to control the energizing current (phase current) supplied to the armature winding 13a for each phase of the first stator 12a of the motor 3 and the armature winding 13b for each phase of the second stator 12b. In other words, the controller 8 converts armature windings 13a, 13a and 13a for the three phases of the first stator 12a and armature windings 13b, 13b and 13b for the three phases of the second stator 12b into equivalent circuits on two-phase DC d-q coordinate system to handle all the armature windings.

The equivalent circuits corresponding to the first stator 12a and the second stator 12b respectively have armatures on a d-axis (hereinafter referred to as the d-axis armatures) and armatures on a q-axis (hereinafter referred to as the q-axis armatures). The d-q coordinate system is a rotary coordinate system which sets the direction of a field produced by the permanent magnets 15 of the rotor 11 on the d-axis and sets the direction orthogonal to the d-axis on the q-axis and which rotates integrally with the rotor 11 of the motor 3.

Further, the controller 8 controls the respective phase currents of the armature winding 13a of the first stator 12a of the motor 3 and the armature windings 13b of the second stator 12b of the motor 3 such that a torque based on a torque command value Tr1_c1 for the first stator 12a and a torque command value Tr2_c1 for the second stator 12b is output from the rotating shaft 3a of the motor 3.

In this case, the controller 8 supplies the drive current to the armature windings 13a of the first stator 12a to operate the motor 3 in the power running mode if the torque command value Tr1_c1 is positive. If the torque command value Tr1_c1 is negative, then the controller 8 recovers the regenerative power produced in the armature windings 13a of the first stator 12a to operate the motor 3 in the regenerative operation mode.

Similarly, the controller 8 supplies the drive current to the armature windings 13b of the second stator 12b to operate the motor 3 in the power running mode when the torque command value Tr2_c1 is positive. If the torque command value Tr2_c1 is negative, then the controller 8 recovers the regenerative power produced in the armature windings 13b of the second stator 12b to operate the motor 3 in the regenerative operation mode.

If both torque command values Tr1_c1 and Tr2_c1 are positive, then the controller 8 supplies the drive current to both the armature windings 13a of the first stator 12a and the armature windings 13b of the second stator 12b. This permits an increase in the output torque of the motor 3 in the power running mode.

If the torque command value Tr1_c1 is positive, while the torque command value Tr2_c1 is negative, then the controller 8 supplies the drive current to the armature windings 13a of the first stator 12a to operate the motor 3 in the power running mode and also recovers the regenerative electric power produced in the armature windings 13b of the second stator 12b by the rotation of the rotor 11.

Similarly, if the torque command value Tr1_c1 is negative, while the torque command value Tr2_c1 is positive, then the controller 8 supplies the drive current to the armature windings 13b of the second stator 12b to operate the motor 3 in the power running mode and also recovers the regenerative electric power produced in the armature windings 13a of the first stator 12a by the rotation of the rotor 11.

If both torque command values Tr1_c1 and Tr2_c1 are negative, then the controller 8 recovers the regenerative electric power produced in the armature windings 13a of the first stator 12a and the armature windings 13b of the second stator 12b by the rotation of the rotor 11. This permits an increase in the regenerative torque of the motor 3 in the regenerative operation mode.

The controller 8 is equipped with a torque command determiner 50 which determines a torque command value Tr1_c2 for the first stator 12a, a d-axis current superposition command value Idf for the first stator 12a, a torque command value Tr2_c2 for the second stator 12b, and an energization waveform command WAVE for instructing a switchover between sinusoidal-wave energization and rectangular-wave energization on the basis of the torque command values Tr1_c1 and Tr2_c1 received from an outer source, the information on electric accessory devices, and a detection value VL_s of a terminal-to-terminal voltage of a second battery 38b.

The controller 8 is also equipped with a first current command determiner 30a which determines a d-axis current command value Id_c1, which is a command value of the current of the d-axis armatures of the first stator 12a (the current corresponding to the field axis current in the present invention; hereinafter referred to as the "d-axis current") and a q-axis current command value Iq_c1, which is a command value of the current of the q-axis armatures (hereinafter referred to as the "q-axis current") on the basis of the torque command value Tr1_c1 and the number of revolutions of the rotor 11 (dθm/dt).

The controller 8 is further equipped with a first current controller 40a which determines a d-axis voltage command value Vd_c1, which is a command value of the voltage of the d-axis armatures of the first stator 12a (hereinafter referred to as the "d-axis voltage") and a q-axis voltage command value Vq_c1, which is a command value of the voltage of the q-axis armatures (hereinafter referred to as the "q-axis voltage") on the basis of the d-axis current command value Id_c1, the q-axis current command value Iq_c1, and the d-axis current superposition command value Idf of the first stator 12a.

The controller 8 is further equipped with current sensors 33a and 34a for detecting the phase currents of the armature windings 13a and 13a of two phases, e.g., the U-phase and the W-phase, out of the armature windings 13a, 13a and 13a for three phases of the first stator 12a, and a dq converter 36a which calculates a d-axis current detection value Id_s1 as a detection value (estimated value) of the d-axis current of the first stator 12a and a q-axis current detection value Iq_s1 as a detection value (estimated value) of the q-axis current on the basis of a current detection value Iu_s1 of the armature winding 13a of the U-phase of the first stator 12a and a current detection value Iw_s1 of the armature winding 13a of the W-phase obtained by passing the outputs of the current sensors 33a and 34a through a band-pass (BP) filter 35a. The BP filter 35a is a filter having a band-pass characteristic for removing noise components from the outputs of the current sensors 33a and 34a.

The dq converter 36a coordinate-converts, according to expression (1) given below, the current detection value Iu_s1 of the armature winding 13a of the U-phase, the current detection value Iw_s1 of the armature winding 13a of the W-phase, and the current detection value Iv_s1 of the armature winding 13a of the V-phase calculated from the above two detection values (Iv_s1=−Iu_s1−Iw_s1) of the first stator 12a on the basis of an electrical angle θe of the rotor 11 calculated by multiplying the detection value θm_s of the rotational angle of the rotor 11 supplied by the resolver 14 by the number of pairs of poles of the rotor 11. Thus, the dq converter 36a calculates the d-axis current detection value Id_s1 and the q-axis current detection value Iq_s1 by the aforesaid coordinate conversion.

$$\begin{bmatrix} Id\_s1 \\ Iq\_s1 \end{bmatrix} = \sqrt{\frac{2}{3}} \cdot A(\theta e) \cdot \begin{bmatrix} Iu\_s1 \\ Iv\_s1 \\ Iw\_s1 \end{bmatrix} \quad (1)$$

where, $$A(\theta e) = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix}$$

The first current controller 40a is equipped with an adder 48 which adds the d-axis current command value Id_c1 and the d-axis current superposition command value Idf, a subtractor 41a which determines a difference ΔId1 between the calculated value supplied by the adder 48 (Id_c1+Idf) and the d-axis current detection value Id_s1 (ΔId1=Id_c1−Id_s1), a d-axis current PI controller 42a which calculates a d-axis voltage basic command value Vd1_c1 by feedback control based on the proportional-integral control (hereinafter referred to as the "PI control") law such that the difference ΔId1 is eliminated or approximated to zero, a subtractor 45a which determines a difference ΔIq1 between a q-axis current command value Iq_c1 and the d-axis current detection value Iq_s1 (ΔIq1=Iq_c1−Iq_s1), a q-axis current PI controller 46a which calculates a q-axis voltage basic command value Vq1_c1 by feedback control based on the PI control law such that the difference ΔIq1 is eliminated or approximated to zero, and a non-interactive controller 44a which determines a d-axis voltage correction amount Vd2_c1 and a q-axis voltage correction amount Vq2_c1 for cancelling a speed electromotive force which causes mutual interference between the d-axis and the q-axis.

The non-interactive controller 44a calculates the d-axis correction amount Vd2_c1 from the q-axis current command value Iq_c1 and a rotor angular velocity calculated by differentiating the rotor angle detection value θm_s, and also calculates the q-axis correction amount Vq2_c1 from the added value of the d-axis current command value Id_c1 and the d-axis current superposition command value Idf, and the rotor angular velocity.

The first current controller 40a further includes an adder 43a which determines a final d-axis voltage command value Vd_c1 by adding the correction amount Vd2_c1 to the d-axis voltage basic command value Vd1_c1, and an adder 47a which determines a final q-axis voltage command value Vq_c1 by adding the correction amount Vq2_c1 to the q-axis voltage basic command value Vq1_c1.

The controller 8 is provided with a three-phase converter 31a which determines the phase voltage command values Vu_c1, Vv_c1, and Vw_c1 of the armature windings 13a of the U-phase, the V-phase, and the W-phase, respectively, of the first stator 12a from the d-axis voltage command value Vd_c1 and the q-axis voltage command value Vq_c1, a first inverter 32a which energizes the armature windings 13a of the individual phases of the first stator 12a on the basis of the above phase voltage command values Vu_c1, Vv_c1, and Vw_c1, and a first battery 38a which supplies electric power to the first inverter 32a.

The three-phase converter 31a coordinate-converts the d-axis voltage command value Vd_c1 and the q-axis voltage command value Vq_c1 on the basis of the electrical angle θe of the rotor 11 according to expression (2) given below thereby to calculate the phase voltage command values Vu_c1, Vv_c1, and Vw_c1. In expression (2), A(θe)$^T$ denotes a transposed matrix of a matrix A(θe) defined by the note in expression (1) mentioned above.

$$\begin{bmatrix} Vu\_c1 \\ Vv\_c1 \\ Vw\_c1 \end{bmatrix} = \sqrt{\frac{2}{3}} \cdot A(\theta e)^T \cdot \begin{bmatrix} Vd\_c1 \\ Vq\_c1 \end{bmatrix} \quad (2)$$

The controller 8 further includes a second current command determiner 30b which determines the d-axis current command value Id_c2 and the q-axis current command value Iq_c2 of the armature windings 13b of the second stator 12b on the basis of the torque command value Tr2_c2 and the number of revolutions (dθm/dt) of the rotor 11, a second current controller 40b which determines the d-axis voltage command value Vd_c2 and the q-axis voltage command value Vq_c2 of the second stator 12b on the basis of the d-axis current command value Id_c2 and the q-axis current command value Iq_c2, current sensors 33b and 34b which detect the phase currents of the armature windings 13b and 13b of the U-phase and the W-phase, respectively, among the armature windings 13b, 13b and 13b of the three phases of the second stator 12b, and a dq converter 36b which calculates the d-axis current detection value Id_s2 and the q-axis current detection value Iq_s2 of the second stator 12b from the current detection value Iu_s2 of the U-phase armature winding 13b and the current detection value Iw_s2 of the W-phase armature winding 13b of the second stator 12b obtained by passing the outputs of the current sensors 33b and 34b through the BP filter 35b.

As with the dq converter 36a, the dq converter 36b coordinate-converts the current detection value Iu_s2 of the U-phase armature winding 13b and the current detection value Iw_s2 of the W-phase armature winding 13b of the second stator 12b and the current detection value Iv_s2 of the V-phase armature winding 13b calculated from the above two current detection values (Iv_s2=−Iu_s2−Iw_s2) on the basis of the electrical angle θe of the rotor 11, thereby calculating the d-axis current detection value Id_s2 and the q-axis current detection value Iq_s2.

The second current controller 40b has the same construction as that of the aforesaid first current controller 40a. The second current controller 40b includes a subtractor 41b which determines a difference ΔId2 between the d-axis current command value Id_c2 and the d-axis current detection value Id_s2 (ΔId2=Id_c2−Id_s2), a d-axis current PI controller 42b which calculates a d-axis voltage basic command value Vd1_c2 by feedback control based on the PI control law such that the difference ΔId2 is eliminated or approximated to zero, a subtractor 45b which determines a difference ΔIq2 between a q-axis current command value Iq_c2 and the q-axis current detection value Iq_s2 (ΔIq2=Iq_c2−Iq_s2), a q-axis current PI controller 46b which calculates a q-axis voltage basic command value Vq1_c2 by feedback control based on the PI control law such that the difference ΔIq2 is eliminated or approximated to zero, and a non-interactive controller 44b which determines a d-axis voltage correction amount Vd2_c2 and a q-axis voltage correction amount Vq2_c2 for cancelling a speed electromotive force which causes mutual interference between the d-axis and the q-axis.

The second current controller 40b further includes an adder 43b which determines a final d-axis voltage command value Vd_c2 by adding the correction amount Vd2_c2 to the d-axis voltage basic command value Vd1_c2, and an adder 47b which determines a final q-axis voltage command value Vq_c2 by adding the correction amount Vq2_c2 to the q-axis voltage basic command value Vq1_c2.

The controller 8 is provided with a three-phase converter 31b which determines the phase voltage command values Vu_c2, Vv_c2, and Vw_c2 of the armature windings 13b of the U-phase, the V-phase, and the W-phase, respectively, of the second stator 12b from the d-axis voltage command value Vd_c2 and the q-axis voltage command value Vq_c2, a second inverter 32b which energizes the armature windings 13b of the individual phases of the second stator 12b on the basis of the phase voltage command values Vu_c2, Vv_c2, and Vw_c2, and a second battery 38b which supplies electric power to the second inverter 32b and which is charged by output power of the second inverter 32b. The second battery 38 corresponds to the DC power source in the present invention.

The controller 8 further includes a plug 52 (corresponding to the AC power source connecting means in the present invention) for connecting to an outlet (not shown) of a commercial AC power source (corresponding to the AC power source in the present invention) provided in a house, an AC/DC converter 53 which, when the plug 52 is connected to the outlet and an AC voltage is supplied from the commercial AC power source, converts the AC voltage into a DC voltage and outputs the DC voltage, a connection sensor 54 which detects whether the plug 52 is in connection with the outlet by detecting the presence or absence of an output from the AC/DC converter 53, and a switch 55 which switches between conduction and shutoff between the AC/DC converter 53 and the first battery 38a.

A battery charge controller 56 provided in the controller 8 issues a control signal Con_c to the switch 55 to close the switch 55 when the connection of the plug 52 to the outlet is detected by a connection detection signal Con_s of the connection sensor 54, thereby establishing conduction between the AC/DC converter 53 and the first battery 38a. Further, the battery charge controller 56 outputs a control signal Ad_c to the AC/DC converter 53 to control the output voltage of the AC/DC converter 53 such that a terminal-to-terminal voltage VH_s (corresponding to a first DC voltage in the present invention and detected by a voltage sensor, which is not shown) of the first battery 38a reaches a predetermined target voltage.

Thus, the plug 52 is connected to the outlet of the commercial AC power source to output a DC voltage to the first battery 38a from the AC/DC converter 53, thereby allowing the first battery 38a to be charged. The second battery 38b can be charged by carrying out the processing for the case where the number of revolutions of the rotor 11 is zero. The processing is a part of the processing for charging the second battery, which will be discussed later.

Figure 5:
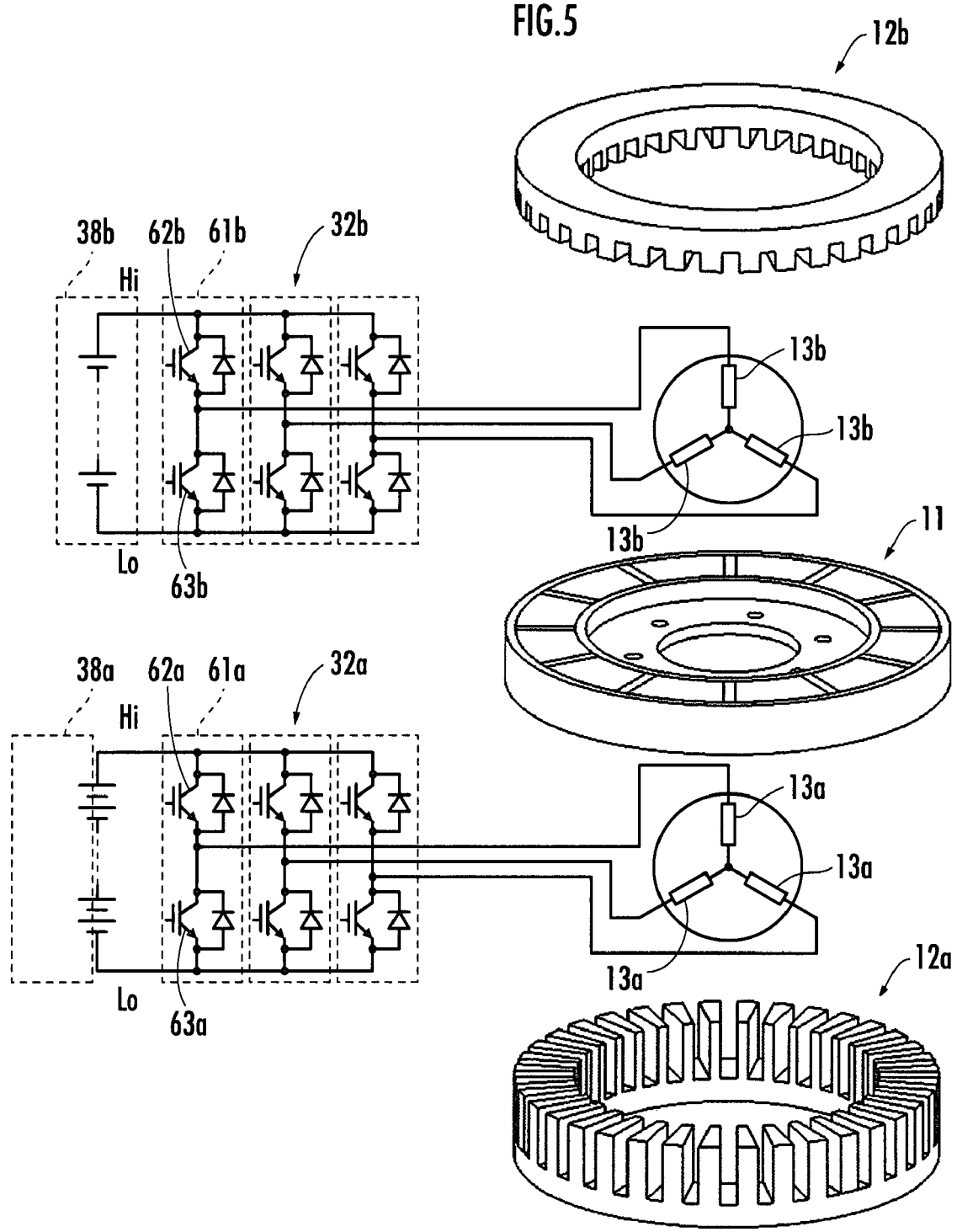
FIG. 5 is a configuration diagram of a drive circuit of the motor.

FIG. 5 illustrates the constructions of the first inverter 32a and the second inverter 32b. In the first inverter 32a, a switching circuit 61a is provided for the armature winding 13a of each phase of the first stator 12a. The switching circuit 61a has a transistor 62a for turning ON/OFF the connection between the armature windings 13a of the individual phases of the first stator 12a and a high potential end (the end indicated by Hi in the figure) of the first battery 38a and a transistor 63a for turning ON/OFF the connection between the armature windings 13a of the individual phases of the first stator 12a and a low potential end (the end indicated by Lo in the figure) of the first battery 38a. The first inverter 32a turns ON/OFF the transistor 62a and the transistor 63a of the switching circuit 61a by PWM control so as to change the amount of current supplied to each of the armature winding 13a.

Similarly, in the second inverter 32b, a switching circuit 61b is provided for the armature winding 13b of each phase of the second stator 12b. The switching circuit 61b has a transistor 62b for turning ON/OFF the connection between the armature windings 13b of the individual phases of the second stator 12b and the high potential end (the end indicated by Hi in the figure) of the second battery 38b and a transistor 63b for turning ON/OFF the connection between the armature windings 13b of the individual phases of the second stator 12b and the low potential end (the end indicated by Lo in the figure) of the second battery 38b. The second inverter 32b turns ON/OFF the transistor 62b and the transistor 63b of the switching circuit 61b by PWM control so as to control the amount of current supplied to each armature winding 13b.

In the present embodiment, the terminal-to-terminal voltage of the first battery 38a is set to be higher than the terminal-to-terminal voltage of the second battery 38b. The DC voltage input to the first inverter 32a corresponds to the first DC voltage in the present invention, and the DC voltage output from the second inverter 32b corresponds to the second DC voltage in the present invention.

Then, the torque command determiner 50 causes the configuration composed of the first inverter 32a, the motor 3, and the second inverter 32b to function as a DC/DC converter to carry out the second battery charging operation for charging the second battery 38b according to an operation state of an electric accessory device operated from the electric power supplied from the second battery 38b such that the terminalto-terminal voltage VL_s of the second battery 38b is maintained in the vicinity of a high level or a low level.

Figure 6:
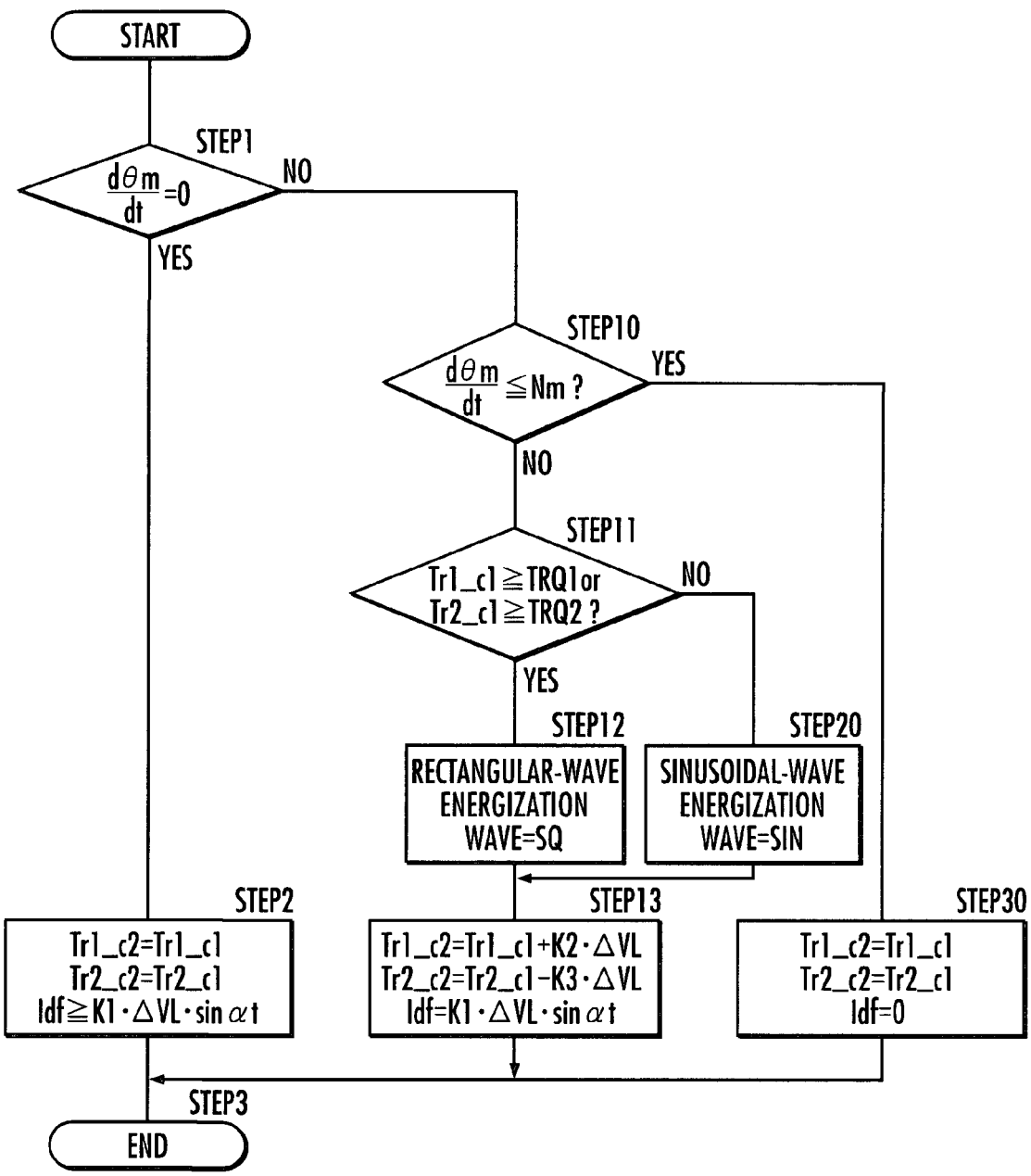
FIG. 6 is a flowchart of the procedure for charging a second battery.

The following will describe the procedure for carrying out the operation for charging the second battery by the torque command determiner 50 with reference to the flowchart illustrated in FIG. 6. The configuration established by the first inverter 32a, the motor 3, and the second inverter 32b, which is used by the torque command determiner 50 to make the configuration function as the DC/DC converter to charge the second battery 38b corresponds to the voltage conversion control means in the present invention.

The torque command determiner 50 determines in STEP1 whether the number of revolutions (dθm/dt) of the rotor 11 is zero, that is, the rotor 11 is not rotating. The torque command determiner 50 proceeds to STEP2 if the number of revolutions of the rotor 11 is zero, or proceeds to STEP10 if the number of revolutions of the rotor 11 is not zero. In STEP2, the torque command determiner 50 calculates the torque command value Tr1_c2 of the first stator 12a for the first current command determiner 30a, the torque command value Tr2_c2 of the second stator 12b for the second current command determiner 30b, and the d-axis current superposition command value Idf according to expression (3) to expression (5) given below.

The torque command determiner 50 applies the accessory device load level obtained from accessory device information to a map 57 for determining a terminal-to-terminal voltage command value VL_c of the second battery 38b illustrated in FIG. 4 to acquire a corresponding command value VL_c (the high level or the low level). The data of map 57 for determining the VL_c is stored in a memory (not shown) in advance.

$$Tr1\_c2 = Tr1\_c1 \quad (3)$$

$$Tr2\_c2 = Tr2\_c1 \quad (4)$$

$$Idf = K1 \cdot \Delta VL \cdot \sin \alpha t \quad (5)$$

wherein K1: Gain coefficient; α: Fixed frequency; and t: Time $$\Delta VL = VL\_c - VL\_s \quad (6)$$

wherein VL_c: Terminal-to-terminal voltage command value of the second battery 38b; and VL_s: Terminal-to-terminal voltage detection value of the second battery 38b Here, when the rotor 11 is at a halt, no induced voltage by the regenerative operation is produced at the armature windings 13b of the second stator 12b. Hence, the d-axis current superposition command value Idf calculated according to the above expression (5) is added to the d-axis current command value Id_c1, and the d-axis current of the first stator 12a is temporally changed by the sinusoidal-wave energization thereby to cause the armature windings 13a of the first stator 12a and the armature windings 13b of the second stator 12b to function as a transformer.

This causes the armature windings 13b of the second stator 12b to develop an induced voltage based on the sinusoidal-wave energization of Idf. The induced voltage is converted into a DC voltage by the second inverter 32b, and the obtained DC voltage is supplied to the second battery 38b to charge the second battery 38b.

Then, in STEP10, the torque command determiner 50 determines whether the number of revolutions dθm/dt of the rotor 11 is a predetermined number of revolutions Nm or less. Here, Nm is set to a level at which it can be determined that the regenerative voltage produced in the armature windings 13b of the second stator 12b is low due to a small number of revolutions of the rotor 11 and the DC voltage converted and output by the second inverter 32b is insufficient to charge the second battery 38b.

If the number of revolutions dθm/dt of the rotor 11 is Nm or less, then the torque command determiner 50 proceeds to STEP 11 to determine whether the torque command value Tr1_c1 of the first stator 12a is a predetermined first torque upper value TRQ1 or more (condition 1) and the torque command value Tr2_c1 of the second stator 12b is a predetermined second torque upper limit value TRQ2 or more (condition 2).

If at least one of condition 1 and condition 2 holds, then the torque command determiner 50 proceeds to STEP12 to set SQ, which denotes the instruction for rectangular-wave energization, in the energization waveform command WAVE. Meanwhile, if neither condition 1 nor condition 2 holds, then the torque command determiner 50 branches to STEP20 to set SIN, which denotes the instruction for sinusoidal-wave energization, in the energization waveform command WAVE.

In the subsequent STEP13, the torque command determiner 50 calculates the torque command value Tr1_c2 for the first current command determiner 30a, the torque command value Tr2_c2 for the second current command determiner 30b, and the d-axis current superposition command Idf according to expression (7) to expression (9) given below.

$$Tr1\_c2 = Tr1\_c1 + K2 \cdot \Delta VL \quad (7)$$

wherein K2: Gain coefficient $$Tr2\_c2 = Tr2\_c1 - K3 \cdot \Delta VL \quad (8)$$

wherein K3: Gain coefficient $$Idf = K1 \cdot \Delta VL \cdot \sin \alpha t \quad (9)$$

Thus, the torque command value Tr1_c2 of the first stator 12a is increased on the basis of an insufficient amount ΔVL of the terminal-to-terminal voltage of the second battery 38b, while the torque command value Tr2_c2 of the second stator 12b is decreased, i.e., the magnitude of a regenerative torque is increased, on the basis of the insufficient amount ΔVL of the terminal-to-terminal voltage of the second battery 38b. Further, setting the d-axis current superposition command value Idf makes it possible to increase the induced voltage produced at the armature windings 13b of the second stator 12b.

Further, if condition 1 and condition 2 described above hold and a high torque is required, then the rectangular-wave energization is engaged in STEP12, so that the peak current supplied to the armature windings 13a of the first stator 12a can be reduced. This makes it possible to increase the current supplied to the armature windings 13a of the first stator 12a, thus allowing the voltage output to the second inverter 32b from the second stator 12b to be increased. This in turn permits an increase in the charging current supplied to the second battery 38b from the second inverter 32b.

The magnitude of the drive current supplied to the armature windings 13b of the first stator 12a on the basis of the first torque upper limit value TRQ1 corresponds to the predetermined current value of the present invention. In STEP 11, STEP 12 and STEP 20, the switching between the rectangular-wave energization and the sinusoidal-wave energization has been performed on the basis of the level of the torque command value Tr1_c1. Alternatively, however, the switching between the rectangular-wave energization and the sinusoidal-wave energization may be performed on the basis of the level of the drive current detection value (Iq_s1) of the armature windings 13a of the first stator 12a.

Further, in STEP30, the torque command determiner 50 determines the torque command value Tr1_c2 for the first current command determiner 30a and the torque command value Tr2_c2 for the second current command determiner 30b according to expression (10) and expression (11) given below.

$$Tr1\_c2 = Tr1\_c1 \quad (10)$$

$$Tr2\_c2 = Tr2\_c1 \quad (11)$$

$$Idf = 0 \quad (12)$$

Thus, a current based on the torque command value Tr1_c1 is supplied to the armature windings 13a of the first stator 12a, while a current for producing a regenerative torque based on the torque command value Tr2_c1 is recovered from the armature winding 13b of the second stator 12b into the second battery 38b through the intermediary of the second inverter 32b.

In this case, the induced voltage developed at the armature windings 13b of the second stator 12b is increased due to the high-speed rotation of the rotor 11, making it possible to supply a sufficient charging current to the second battery 38b from the second inverter 32b. Hence, it is not required to supply the d-axis current to the armature windings 13a of the first stator 12a in order to increase the induced voltage developed at the armature windings 13b of the second stator 12b. Hence, the d-axis current superposition command value Idf is set to zero according to expression (12) given above.

In the present embodiment, the torque command determiner 50 has calculated the d-axis current superposition command value Idf by the PI control according to expression (5) and expression (6) given above. Alternatively, however, the d-axis current superposition command value Idf may be calculated by the PI control according to expression (13) shown below.

$$Idf = Kp \cdot \Delta VL + Ki \Sigma \Delta VL \cdot \sin \omega t \quad (13)$$

wherein Kp: Proportional gain; and Ki: Integral gain

Figure 7A:
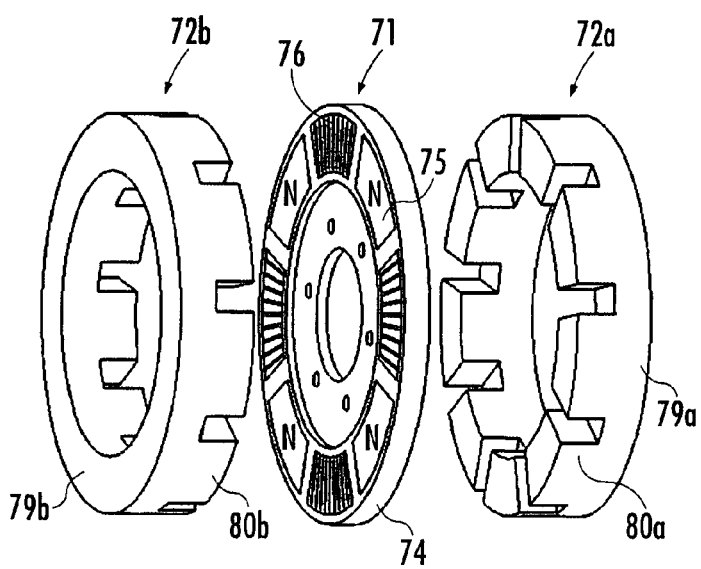
FIGS. 7(a) to 7(c) are diagrams illustrating another construction example of the motor.
Figure 7B:
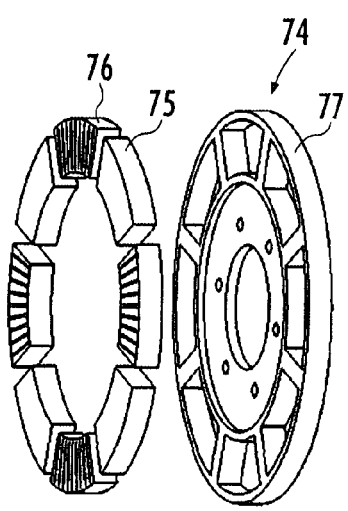
Figure 7C:
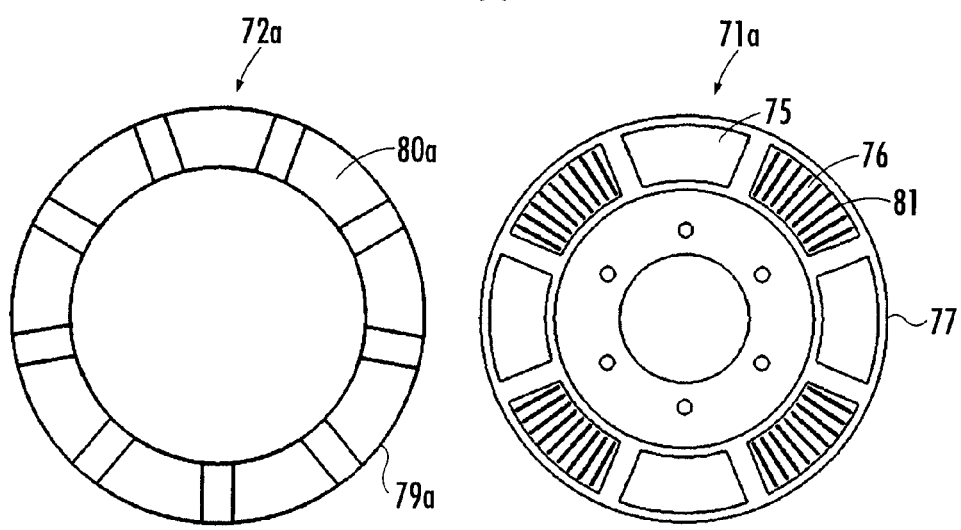

Referring now to FIG. 7 and FIG. 8, another construction example of the motor 3 will be described. The example illustrated in FIG. 7(a) to FIG. 7(c) has replaced half the magnets attached to the rotor by magnetic yokes so as to reduce the number of required magnets to half.

Referring to FIG. 7(a) to FIG. 7(c), a rotor 71 includes a first stator 72a and a second stator 72b, which oppose the rotor 71, a frame member 74 made of a nonmagnetic material, and a plurality of permanent magnets 75 and magnetic yokes 76, which are alternately attached to the frame member 74. Each of the plurality of magnets 75 is installed such that the surface thereof facing the second stator 72b is the N-pole, while the other surface thereof facing the first stator 72a is the S-pole.

Alternately disposing the permanent magnets 75 and the magnetic yokes 76 as described above makes it possible to reduce the number of the permanent magnets 75 to be used and also to increase the coupling coefficient of the first stator 72a and the second stator 72b as a transformer. This arrangement permits enhanced efficiency of the configuration established by a first inverter 32a, a motor 3, and a second inverter 32b to function as a DC/DC converter.

Furthermore, the magnetic yokes 76 are provided with slits 81 so as to change the magnetic resistances of the magnetic yokes 76 in the circumferential direction of the rotor 71, thereby further enhancing the coupling coefficient of the first stator 72a and the second stator 72b as a transformer.

Referring now to FIG. 7(a) and FIG. 7(c), the first stator 72a has nine teeth 80a provided such that they project from an end surface of an annular base member 79a, the end surface opposing the rotor 71, in the axial direction of the base member 79a, and the teeth 80a are arranged at equiangular intervals about the axial center of the base member 79a. Similarly, the second stator 72b has nine teeth 80b provided such that they project from an end surface of an annular base member 79b, the end surface opposing the rotor 71, in the axial direction of the base member 79b, and the teeth 80b are arranged at equiangular intervals about the axial center of the base member 79b.

Figure 8A:
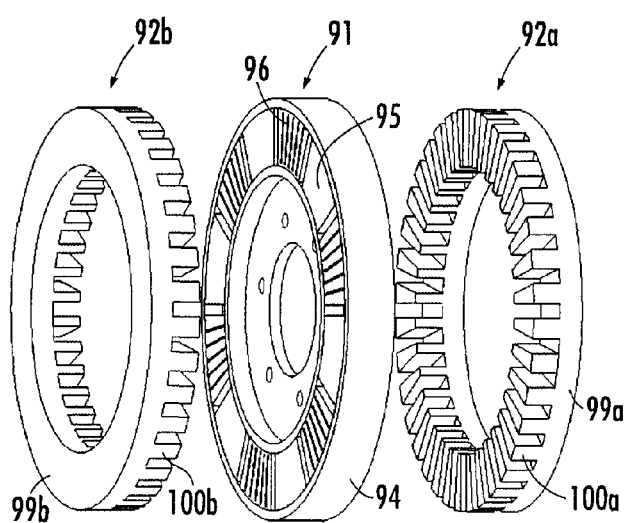
FIGS. 8(a) to 8(c) are diagrams illustrating still another construction example of the motor.
Figure 8B:
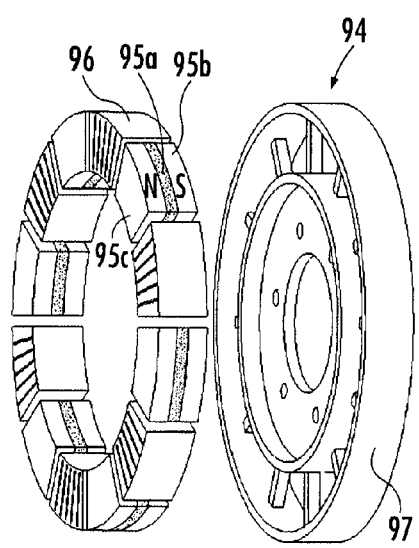
Figure 8C:
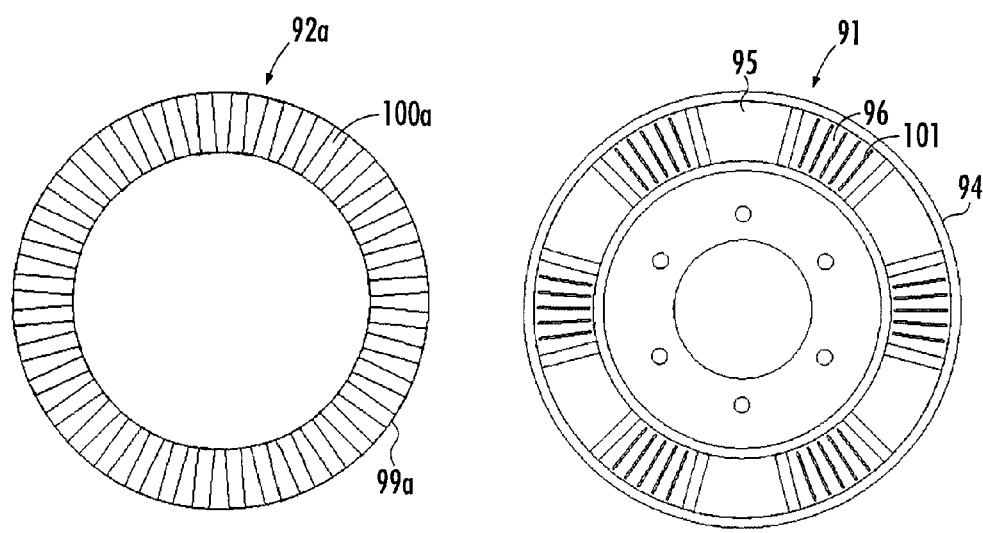

An example illustrated in FIG. 8(a) to FIG. 8(c) has replaced the permanent magnets 75 in the construction illustrated in FIG. 7(a) to FIG. 7(c) by magnetic blocks 95, each of which is composed of a permanent magnet 95a and magnetic surface yokes 95b and 95c, which sandwich the permanent magnet 95a. This arrangement also allows the number of required permanent magnets to be reduced to half.

Referring to FIG. 8(a) to FIG. 8(c), a rotor 91 is provided, opposing a first stator 92a and a second stator 92b, and composed of a frame member 94 made of a nonmagnetic material, and a plurality of magnetic blocks 95 and magnetic yokes 96 alternately arranged and attached to the frame member 94.

Each of the plurality of magnetic blocks 95 is installed such that the end of a permanent magnet 95a that opposes the second stator 92b is the N-pole, while the end thereof that opposes the first stator 92a is the S-pole. Thus, the use of the magnetic blocks 95 makes it possible to further reduce the amount of permanent magnet to be used. The magnetic yokes 96 are provided with slits 101.

Referring to FIG. 8(a) and FIG. 8(c), the first stator 92a has thirty-six teeth 100a provided such that they project from the end surface of an annular base member 99a, which end surface opposes the rotor 91, in the axial direction of the base member 99a, the teeth 100a being arranged about the axial center of the base member 99a at equiangular intervals. Similarly, the second stator 92b has thirty-six teeth 100b provided such that they project from the end surface of an annular base member 99b, which end surface opposes the rotor 91, in the axial direction of the base member 99b, the teeth 100b being arranged about the axial center of the base member 99b at equiangular intervals.

In the present embodiment, the characteristics of the armature windings 13a and the armature windings 13b have been set such that the induced voltage developed at the armature windings 13b of the second stator 12b is lower than the voltage applied to the armature windings 13a of the first stator 12a. With this arrangement, the configuration established by the first inverter 32a, the first stator 12a, the second stator 12b, and the second inverter 32b has functioned as a downconverter. Conversely, however, the characteristics of the armature windings 13a and the armature windings 13b may be set such that the induced voltage developed at the armature windings 13b of the second stator 12b is higher than the voltage applied to the armature windings 13a of the first stator 12a, thus causing the aforesaid configuration to function as an upconverter.

Further, in the present embodiment, the operation for charging the second battery has been performed by setting the first inverter 32a as the input end and the second inverter 32b as the output end. Alternatively, however, the first battery charging operation for charging the first battery 38a may be performed by setting the second inverter 32b as the input end and the first inverter 32a as the output end. Further alternatively, the operation may be switched between the second battery charging operation and the first battery charging operation according to the charged states of the first battery 38a and the second battery 38b.

In the present embodiment, in STEP11 to STEP12 and STEP20 of FIG. 6, the energization control over the armature windings 13a of the first stator 12a and the armature windings 13b of the second stator 12b has been switched between the rectangular-wave energization mode and the sinusoidal-wave energization mode on the basis of the number of revolutions of the rotor 11. The advantages of the present invention, however, remain available even if the switching between the two energization modes is not performed.

Further, in the present embodiment, when carrying out the power-running/regenerative operation in STEP13 of FIG. 6, the d-axis current superposition command value Idf has been set to implement the processing for increasing the induced voltage produced at the armature windings 13b of the second stator 12b. The advantages of the present invention, however, remain available even when such processing is not carried out.

What is claimed is:

1. A motor controller for an axial-gap motor equipped with a rotor, and a first stator and a second stator which are provided such that they oppose each other with the rotor interposed therebetween in the rotational axial direction of the rotor and which have coils for plurality of phases, the motor controller comprising:
   a first inverter connected to the first stator;
   a second inverter connected to the second stator; and
   a voltage conversion controller which inputs a first DC voltage to the first inverter to supply a field axis current for changing the magnetic flux of a field of the rotor to the first stator from the first inverter while temporally changing the amount of the field axis current, and converts an induced voltage produced in the second stator according to the supplied field axis current into a second DC voltage by the second inverter and outputs the second DC voltage in at least one of two cases where the rotor is at a halt and where the number of revolutions of the rotor is a predetermined number of revolutions or less.

2. The motor controller according to claim 1, wherein
   the voltage conversion controller carries out a power-running/regenerative operation whereby drive current is supplied to the first stator from the first inverter to operate the motor in a power running mode, and a regenerative voltage produced in the second stator according to a revolution of the rotor is converted into a DC voltage by the second inverter and then the DC voltage is output, and
   while the power-running/regenerative operation is being carried out, the drive current is supplied to the first stator from the first inverter and the field axis current is also supplied to the first stator from the first inverter while temporally changing the amount of the field axis current to be supplied, and a regenerative voltage produced in the second stator according to a revolution of the rotor and an induced voltage produced in the second stator according to the supplied field axis current are converted into the second DC voltage by the second inverter and then the second DC voltage is output.

3. The motor controller according to claim 2, wherein
   the voltage conversion controller supplies the drive current by rectangular-wave energization to the first stator from the first inverter in the case where the number of revolutions of the rotor is a predetermined number of revolutions or less and the drive current is a predetermined current value or more while the power-running/regenerative operation is being carried out.

4. The motor controller according to claim 1, further comprising:
   an AC power source connecting means for connecting with an AC power source;
   an AC/DC converter which is connected between the AC power source connecting means and the first inverter and which converts an AC voltage output from the AC power source into a DC voltage when the AC power source is connected to the AC power source connecting means, and then outputs the DC voltage to the first inverter; and
   a DC power source connected to the second inverter,
   wherein the moment the AC power source is connected to the AC power source connecting means, the voltage conversion controller defines the DC voltage supplied to the first inverter from the AC/DC converter as the first DC voltage, supplies the field axis current to the rotor from the first inverter while temporally changing the amount thereof, converts an induced voltage generated in the second stator according to the supplied field axis current into a DC voltage by the second inverter, and charges the DC power source with the DC voltage.

5. The motor controller according to claim 1, wherein
   the rotor has the field poles of permanent magnets and the field poles of unmagnetized magnetic members, which are alternately disposed in the circumferential direction, and the permanent magnets are provided such that one of the N-pole and the S-pole of each thereof opposes the first stator, while the other pole thereof opposes the second stator.

6. The motor controller according to claim 5, wherein
   the field poles of the unmagnetized members are formed such that the magnetic resistance changes in the circumferential direction.

7. The motor controller according to claim 1, wherein
   the cross-sectional area of a magnetic circuit of the first stator and the cross-sectional area of a magnetic circuit of the second stator are the same.

* * * * *